United States Patent
Morinaga

(10) Patent No.: US 12,113,943 B2
(45) Date of Patent: Oct. 8, 2024

(54) IMAGE READING AND PRINTING APPARATUS

(71) Applicant: CANON KABUSHIKI KAISHA, Tokyo (JP)

(72) Inventor: Kazuyuki Morinaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 17/523,848

(22) Filed: Nov. 10, 2021

(65) Prior Publication Data

US 2022/0210282 A1  Jun. 30, 2022

(30) Foreign Application Priority Data

Dec. 28, 2020 (JP) ................. 2020-218726

(51) Int. Cl.
| | | |
|---|---|---|
| B41J 29/13 | (2006.01) | |
| B41J 29/38 | (2006.01) | |
| H04N 1/00 | (2006.01) | |
| H04N 1/04 | (2006.01) | |
| H04N 1/028 | (2006.01) | |

(52) U.S. Cl.
CPC .......... *H04N 1/00525* (2013.01); *B41J 29/38* (2013.01); *H04N 1/00557* (2013.01); *H04N 1/00559* (2013.01); *H04N 1/0057* (2013.01); *H04N 1/04* (2013.01); *H04N 1/02895* (2013.01)

(58) Field of Classification Search
None
See application file for complete search history.

(56) References Cited

U.S. PATENT DOCUMENTS

| | | | |
|---|---|---|---|
| 6,130,682 A  * | 10/2000 | Kohno | B41J 2/16579 |
| | | | 347/3 |
| 6,426,803 B1 | 7/2002 | Sasai et al. | 358/400 |
| 8,014,037 B2 | 9/2011 | Iwata et al. | 358/400 |
| 2005/0151762 A1 | 7/2005 | Griesemer et al. | H04N 1/00 |
| 2007/0228642 A1* | 10/2007 | Terada | B41J 11/06 |
| | | | 271/109 |
| 2018/0126759 A1 | 5/2018 | Moriyama et al. | B41J 25/304 |

FOREIGN PATENT DOCUMENTS

| | | |
|---|---|---|
| JP | 2013-166328 | 8/2013 |
| JP | 2013166328 A  * | 8/2013 |
| JP | 2015-079040 | 4/2015 |

(Continued)

OTHER PUBLICATIONS

Obara, MachineTranslationofJP-2015079040-A, 2015 (Year: 2015).*

(Continued)

*Primary Examiner* — Scott A Richmond
(74) *Attorney, Agent, or Firm* — Venable LLP

(57) ABSTRACT

In a reading device part, a scan motor that moves a sensor unit relative to a document is accommodated in an accommodating portion protruding from the bottom surface of the reading device part toward a printing device part. A carriage in the printing device part and the accommodating portion are arranged so as to face each other in a direction crossing the scan direction of the carriage at the same height in the vertical direction. A flexible member connected to the carriage moves and follows the carriage on a lower side relative to the accommodating portion.

11 Claims, 13 Drawing Sheets

(56) References Cited

FOREIGN PATENT DOCUMENTS

| | | | |
|---|---|---|---|
| JP | 2015079040 A | * | 4/2015 |
| JP | 2016-022726 | | 2/2016 |
| JP | 2018-079678 | | 5/2018 |

OTHER PUBLICATIONS

Charif, MachineTranslationofJP-2013166328-A, 2013 (Year: 2013).*
Office Action dated Aug. 6, 2024 in counterpart Japanese Application No. 2020-218726, together with English translation thereof.

* cited by examiner

IMAGE READING AND PRINTING APPARATUS

BACKGROUND OF THE INVENTION

Field of the Invention

The present invention relates to an image reading and printing apparatus having an image reading function and an image printing function.

Description of the Related Art

A multi-function peripheral (image reading and printing apparatus) has been provided which includes a flatbed-type reading unit stacked on the upper side of a serial print-type printing unit in the vertical direction and has both a reading function and a printing function. For such an image reading and printing apparatus, reducing the height of the entire apparatus has heretofore been a challenge.

Japanese Patent Laid-open No. 2015-079040 discloses a configuration in which, focusing on the fact that the volume occupied by a motor for scanning a reading head is particularly large inside a reading unit, this motor is arranged to be offset relative to another constituent element of the reading unit in a direction crossing both the scan direction of the reading head and the vertical direction.

However, in the configuration of Japanese Patent Laid-open No. 2015-079040, a printing carriage that performs a printing operation while moving inside the apparatus is arranged at a position lower than the above-mentioned motor and other mechanisms in the printing unit. Specifically, the region necessary for the above-mentioned motor and other mechanisms and the region for the scan of the printing carriage are separated from each other in the height direction, and the height of the entire apparatus is reduced only to a small extent.

SUMMARY OF THE INVENTION

The present invention has been made to solve the above problem. An object of the present invention is therefore to reduce the height of an image reading and printing apparatus having both a reading function and a printing function to a greater extent than conventional ways.

Further features of the present invention will become apparent from the following description of exemplary embodiments with reference to the attached drawings.

DESCRIPTION OF THE EMBODIMENTS

First Embodiment

Figure 1:
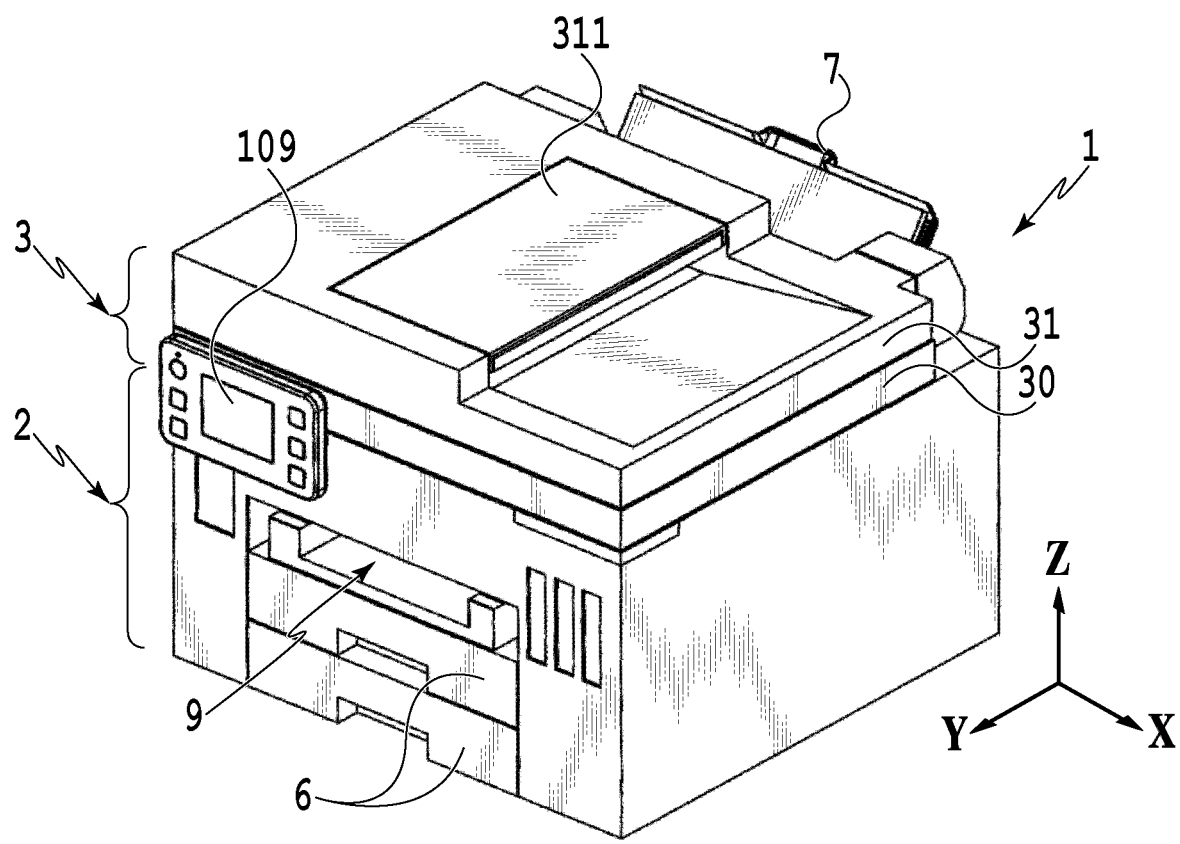
FIG. 1 is a perspective view of an exterior of an image reading and printing apparatus used in a first embodiment.

FIG. 1 is a perspective view of an exterior of an image reading and printing apparatus 1 used in the present embodiment. In FIG. 1, the X direction represents the width direction of the image reading and printing apparatus 1, the Y direction represents the depth direction of the image reading and printing apparatus 1, and the Z direction represents the upward vertical direction. The image reading and printing apparatus 1 in the present embodiment includes a printing device part 2 and a reading device part 3 which occupy substantially the same region in a XY plane and are stacked in the Z direction.

At the front of the printing device part 2, sheet feeding cassettes 6 capable of accommodating sheets on which to perform printing in the printing device part 2 are arranged one on top of the other. A user can supply sheets into each sheet feeding cassette 6 by pulling it out toward the near side (+Y direction). Sheets of the same size may be set in the two sheet feeding cassettes 6, or sheets of different sizes may be set in them. At the back of the printing device part 2, on the other hand, an auto sheet feeder (ASF) 7 for manually feeding a thick sheet or another print medium is provided. A print medium after an image is printed thereon is discharged from a discharge aperture 9, regardless of whether it is fed from one of the sheet feeding cassettes 6 or from the ASF 7.

The reading device part 3 has a scanner unit 30 that actually performs a reading process and an auto document feeder (ADF) 31 that is capable of conveying a document to the scanner unit 30. A document tray 311 on which the user places a document(s) (original copy) is provided in foldable manner to the ADF 31. FIG. 1 illustrates a state where the document tray 311 is folded. A plurality of sheets of documents can be placed on the document tray 311. At the front of the reading device part 3, an operation unit 109 is provided with which the user checks the state of the image reading and printing apparatus 1 and inputs instructions addressed to the image reading and printing apparatus 1.

In the image reading and printing apparatus 1 in the present embodiment, the reading device part 3 is configured to be openable and closable relative to the printing device part 2.

Figure 2A:
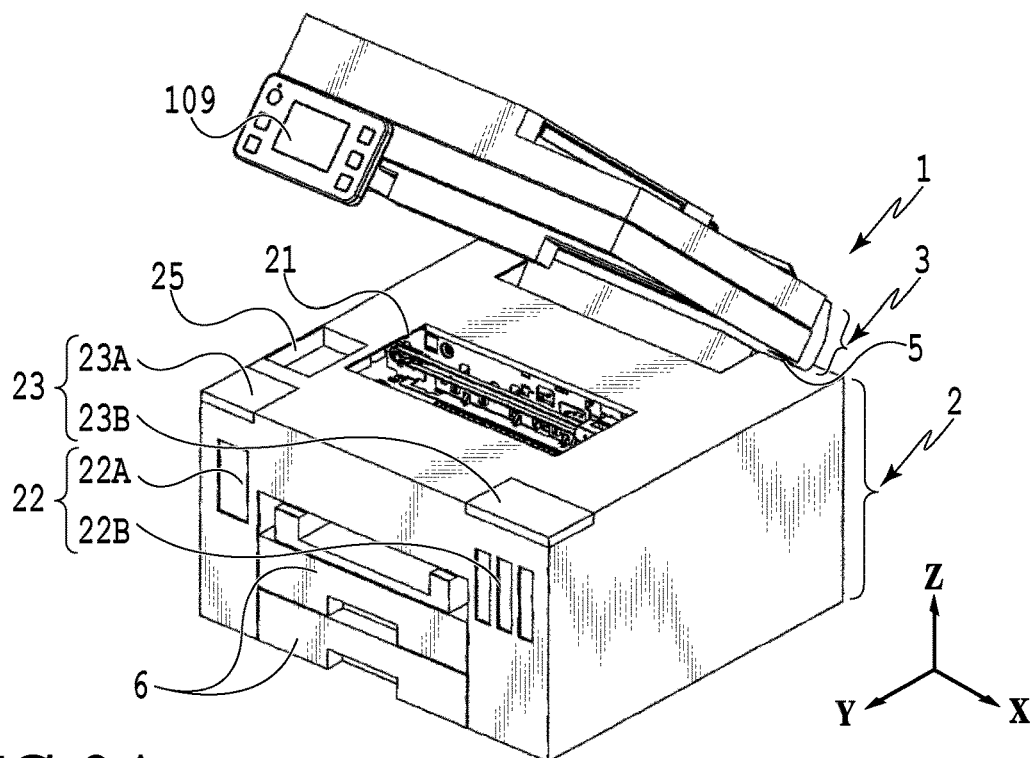
FIGS. 2A and 2B are a perspective view and a cross-sectional view illustrating a state where the upper surface of a printing device part is exposed.
Figure 2B:
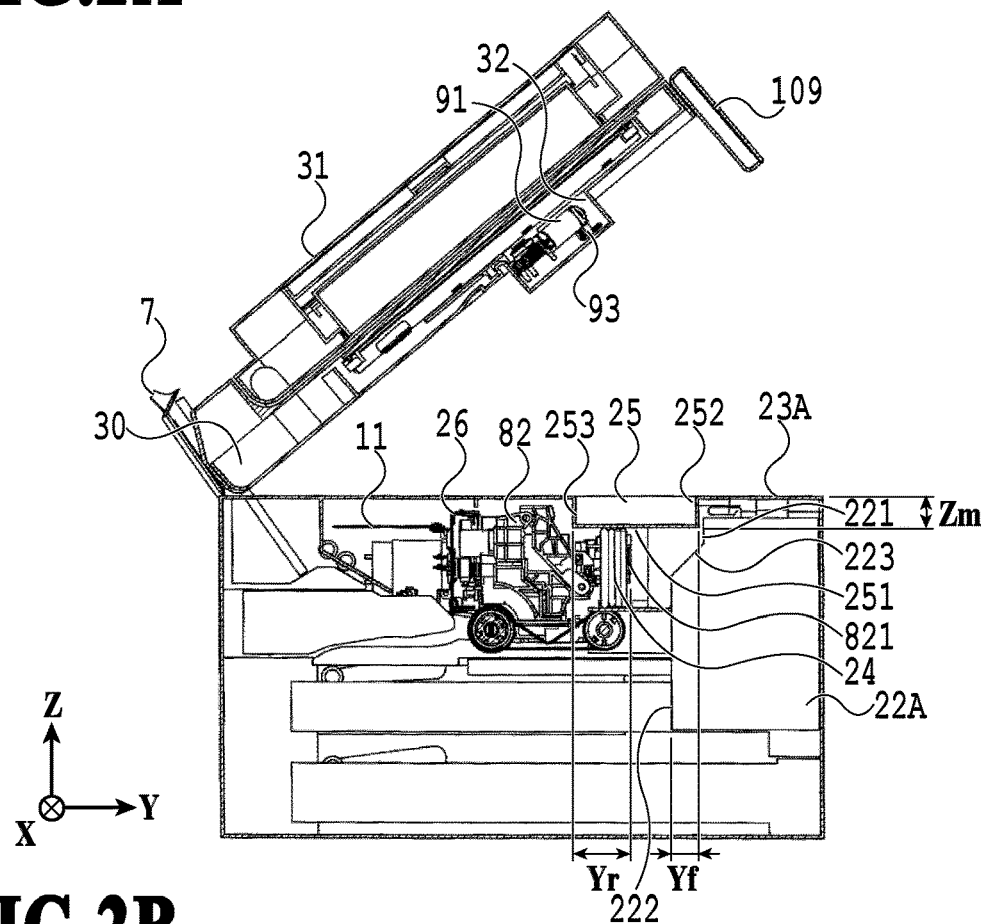

FIGS. 2A and 2B are a perspective view and a cross-sectional view illustrating a state where the upper surface of the printing device part 2 is exposed. The printing device part 2 and the reading device part 3 are connected via a hinge 5, and the reading device part 3 is pivotable relative to the printing device part 2 about the hinge 5. In a case where the user lifts up and pivot the reading device part 3, an opening 21 and lids 23 of the printing device part 2 are exposed. With the upper surface of the printing device part 2 exposed as above, the user can perform ink replenishment or a maintenance process on the printing device part 2.

As illustrated in FIG. 2A, ink tanks 22 capable of containing inks (printing agents) to be used in the printing device part 2 are arranged on both the left and right sides of the sheet feeding cassettes 6. In the present embodiment, an ink tank 22A on the left side contains a black ink, and an ink tank 22B on the right side separately contains cyan, magenta, and yellow color inks. The user can replenish each ink tank 22 with the corresponding ink(s) by opening a corresponding lid 23A or 23B. As illustrated in FIG. 2B, inside the printing device part 2, there is arranged a carriage 82 carrying a print head 81 (see FIGS. 4A and 4B) and being movable in the ±X direction.

Figure 3A:
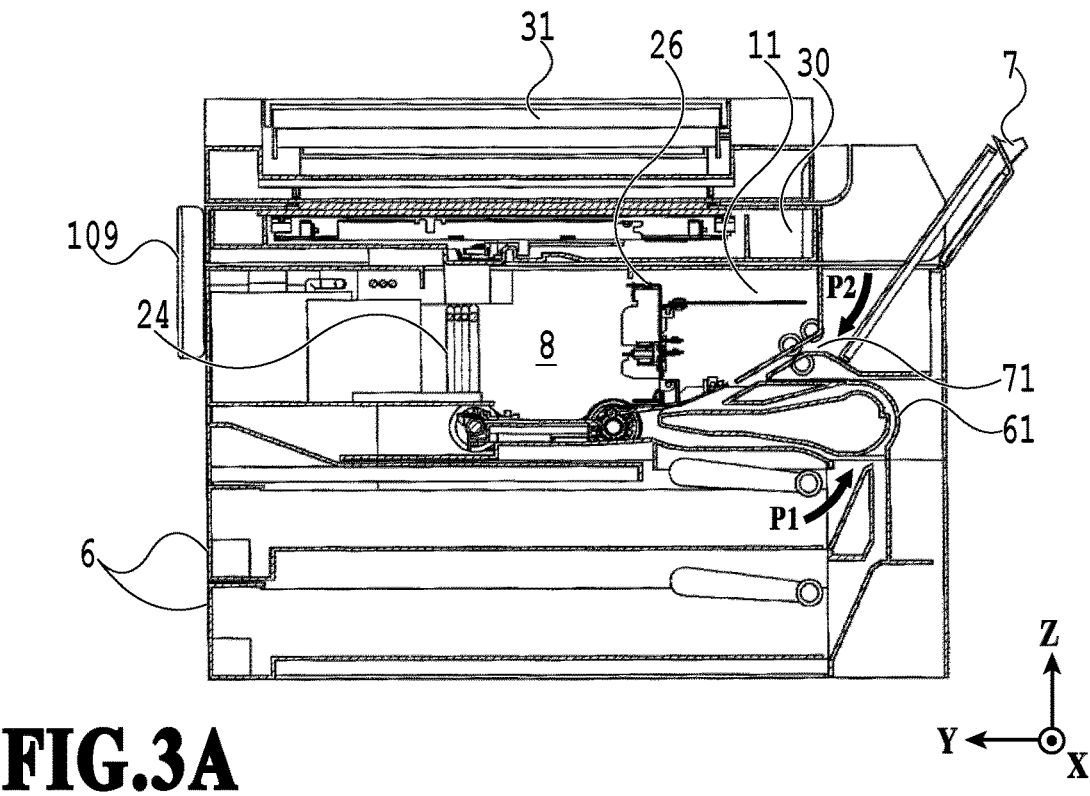
FIGS. 3A and 3B are side cross-sectional views of the image reading and printing apparatus.
Figure 3B:
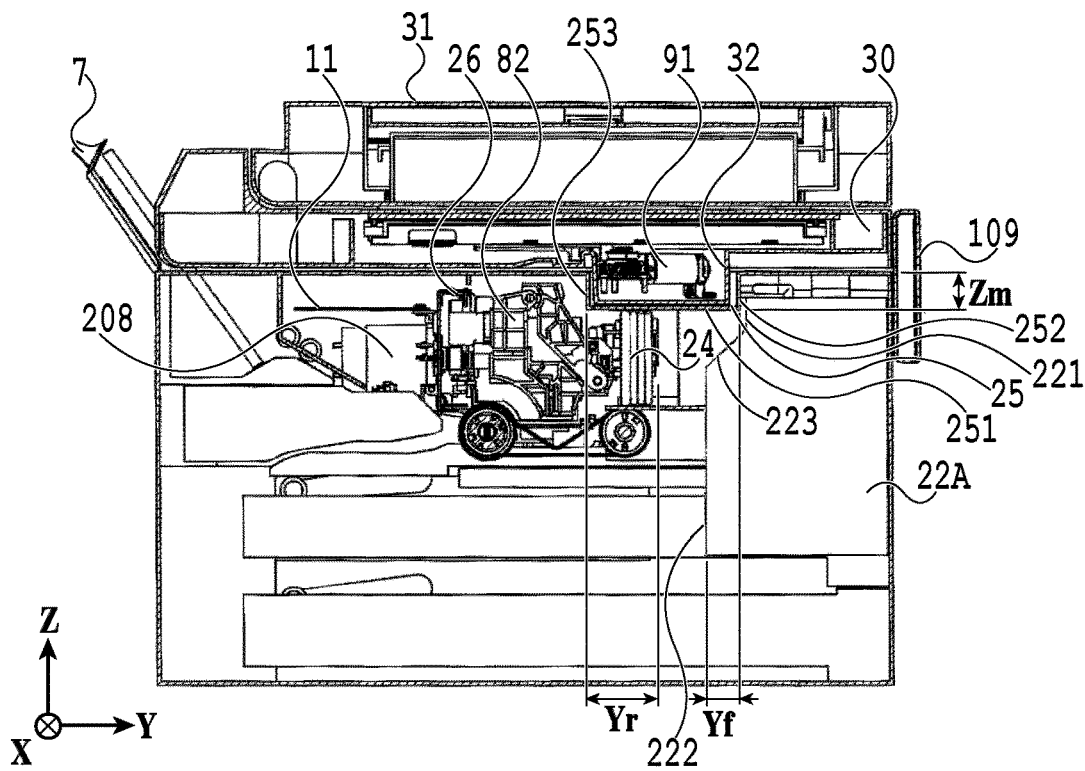

FIGS. 3A and 3B are side cross-sectional views of the image reading and printing apparatus 1. FIGS. 3A and 3B illustrate a state where the reading device part 3 is closed relative to the printing device part 2. FIG. 3A is a cross-sectional view as seen from the +X direction side, and specifically illustrates sheet conveyance routes in the printing device part 2. In FIG. 3A, the print head 81 and the carriage 82 are omitted, and the entire region where the print head 81 and the carriage 82 move to print an image onto a sheet is illustrated as a printing section 8. The printing section 8 includes the entire region for movement of the print head 81, the carriage 82, ink tubes 24 through which to supply the inks to the print head 81, and so on.

In a case of performing a printing operation, a sheet P1 accommodated in one of the sheet feeding cassettes 6 passes through a first conveyance path 61 and is fed to the printing section 8. Also, a sheet P2 loaded in the ASF 7 passes through a second conveyance path 71 and is fed to the printing section 8. A control board 11 that controls the entire apparatus is arranged above these first and second conveyance paths 61 and 71. The control board 11 is fixed to a chassis 26 extending in the X direction and is connected to various electric components installed in the image reading and printing apparatus 1 via cables not illustrated.

FIG. 3B illustrates a side cross-sectional view of a state where the carriage 82 is present at a left end portion (−X side) as seen from the −X side. The carriage 82 is arranged on the opposite side of the chassis 26 from the control board 11, and is capable of moving reciprocally in the ±X direction with a carriage motor 208 as a driving source while being guided and supported by the chassis 26 extending in the X direction. The carriage 82 is connected to the control board 11 via a flexible cable not illustrated, and sends print data received from the control board 11 to the print head 81. In a state where the carriage 82 is present at either end portion (end portion in the ±X direction), the ink tank 22A or the ink tank 22B is arranged on part of the front side (+Y side) of the carriage 82. Note that the lower surfaces of the ink tanks 22A and 22B are located vertically lower than the lower plane of the printing section 8. This can increase the containable amounts of the inks.

While the carriage 82 moves, the print head 81 mounted on the carriage 82 ejects the inks according to print data received from the control board 11. As a result, an image of a single band is printed onto a sheet present at the printing section 8. Each time a printing scan as above is performed, a conveyance motor 212 (see FIG. 9) is driven such that the sheet is conveyed in the +Y direction by a distance corresponding to a single band. By alternately repeating a printing scan and a conveyance operation as above, an image is printed onto the sheet in a step-by-step manner.

The printing device part 2 and the scanner unit 30 both have a substantially box shape and are stacked with the upper surface of the printing device part 2 in contact with the bottom surface of the scanner unit 30. While the upper surface of the printing device part 2 and the bottom surface of the scanner unit 30 are substantially flat, an accommodating portion 32 protruding downward and a receiving portion 25 are formed at a region where the carriage 82 and the black ink tank 22A face each other. Specifically, in the bottom surface of the scanner unit 30, the accommodating portion 32 to accommodate a scan motor 91 is formed so as to protrude downward. Also, in the upper surface of the printing device part 2, the receiving portion 25 to receive the accommodating portion 32 is formed so as to dent downward. The arrangement of the accommodating portion 32 and the receiving portion 25 will be specifically described later.

Figure 4A:
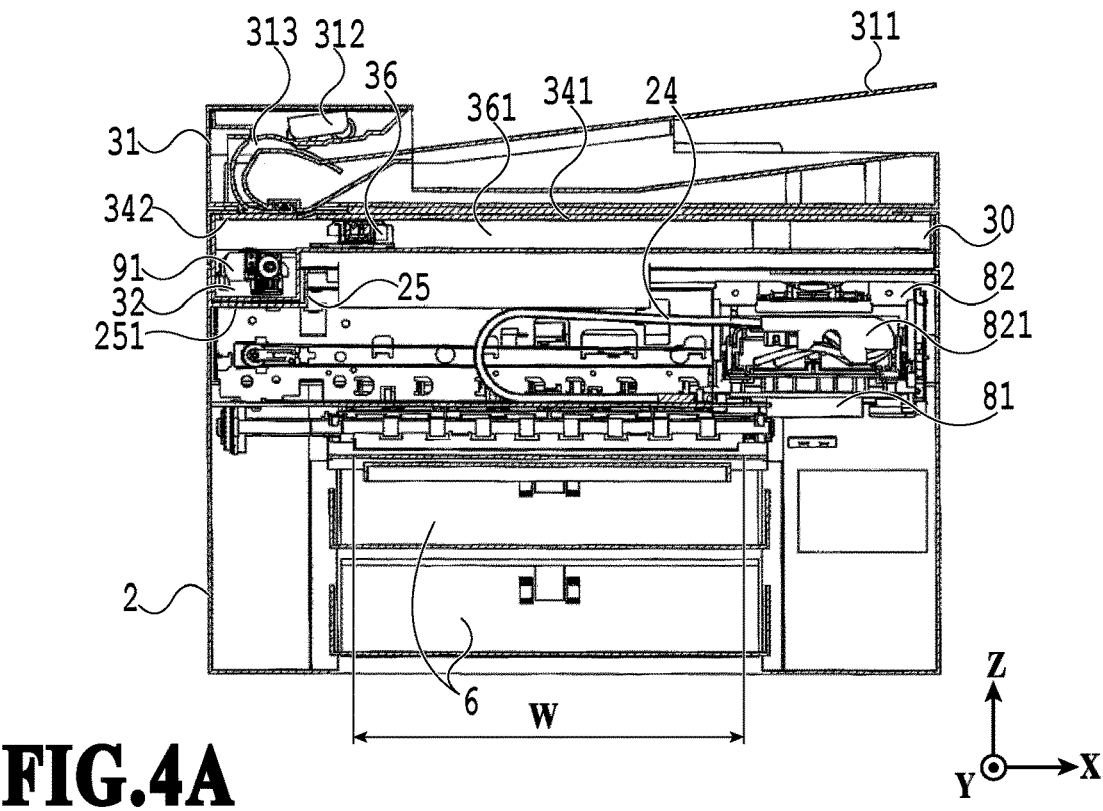
FIGS. 4A and 4B are front cross-sectional views of the image reading and printing apparatus.
Figure 4B:
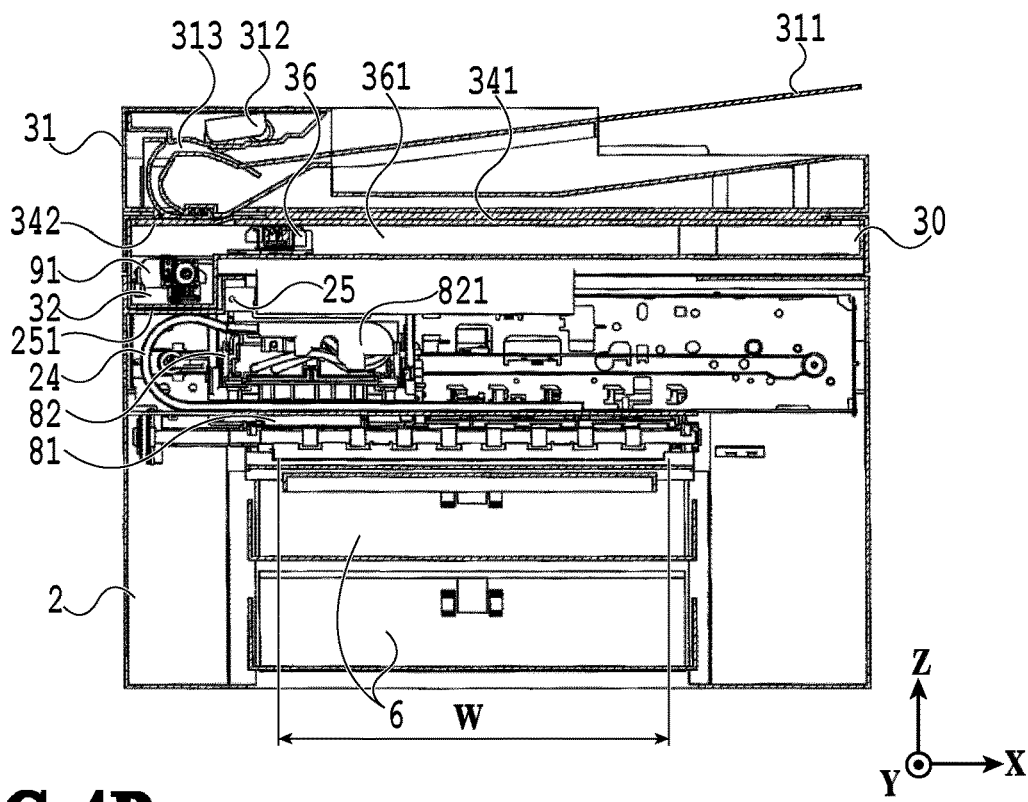

FIGS. 4A and 4B are front cross-sectional views of the image reading and printing apparatus 1. FIG. 4A illustrates a state where the carriage 82 is present at the right end of a scannable region W, and FIG. 4B illustrates a state where the carriage 82 is present at the left end of the scannable region W. In FIGS. 4A and 4B, a right end portion is a home position, which is a position where the carriage 82 stands by or maintenance is performed in a case where no printing operation is performed. At the home position, various members for maintenance of the print head 81 are provided. On the other hand, in the state where the carriage 82 is present at the left end, part of the carriage 82 and the accommodating portion 32 overlap with each other in the X direction and the Z direction. In the Y direction, however, the accommodating portion 32 overlaps with neither an upper portion of the carriage 82 nor an upper portion of the ink tank 22A.

The scanner unit 30 is provided on the printing device part 2, and the ADF 31 is provided on the scanner unit 30. FIGS. 4A and 4B illustrate a state where the document tray 311 is unfolded, i.e., a state where documents can be set in the ADF 31. In the ADF 31, a separator 312 is a mechanism that separates one sheet of document from a plurality of sheets of documents placed on the document tray 311. A document conveyance route 313 is a route through which to guide the document separated by the separator 312 to a position where the scanner unit 30 can read the document.

Figure 5:
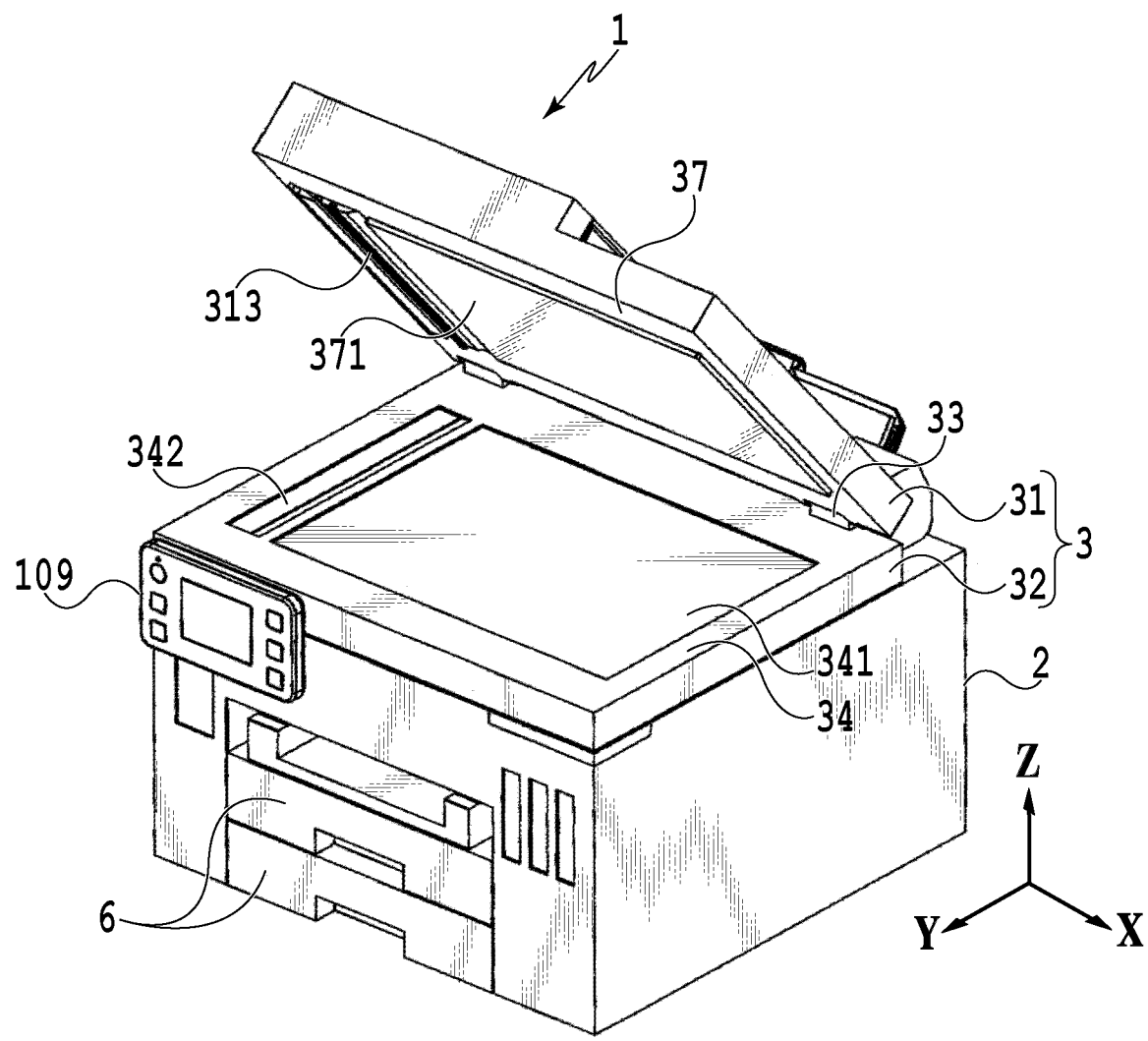
FIG. 5 is a view illustrating a state where an ADF is opened relative to a scanner unit.

FIG. 5 is a view illustrating a state where the ADF 31 is opened relative to the scanner unit 30. The reading device part 3 in the present embodiment is also capable of reading a document (original copy) in a flatbed fashion, in which case the user lifts up the ADF 31 and places the document between the scanner unit 30 and the ADF 31. The ADF 31 is pivotable relative to the scanner unit 30 about a hinge 33.

Platen glass 341 and ADF glass 342 are arranged at the upper surface of the scanner unit 30, and these are held by a document glass holding member 34. A document cover 37 is arranged at the lower surface of the ADF 31. To the document cover 37, a document pressing sheet 371 made of a sheet material and sponge is attached for pressing a document placed on the platen glass 341 against the platen glass 341. Note that part of the document conveyance route 313 is exposed at a position located a side of the document pressing sheet 371 and facing the ADF glass 342. In a case where the user sets a document on the platen glass 341, closes the ADF 31, and then issues an instruction to perform a document reading operation via the operation unit 109, a document reading process starts.

Refer to FIGS. 4A and 4B again. In the scanner unit 30, a sensor unit 36 that reads a document through the platen glass 341 or the ADF glass 342 and a movement space 361 for the sensor unit 36 are arranged under the platen glass 341 and the ADF glass 342. Also, the scan motor 91, which moves the sensor unit 36 in the ±X direction within the movement space 361, and the accommodating portion 32, which accommodates the scan motor 91, are arranged on a left side under the movement space 361.

With the above configuration, in a case of performing a reading process in a flatbed fashion, the sensor unit 36 reads an image of a document placed on the platen glass 341 through the platen glass 341 while moving in the X direction at a predetermined speed. On the other hand, in a case of performing a reading process in an ADF fashion, the sensor unit 36 moves to and stops at the position immediately under the ADF glass 342, and reads an image of a document conveyed by the ADF 31 at a predetermined speed through the ADF glass 342.

Figure 6:
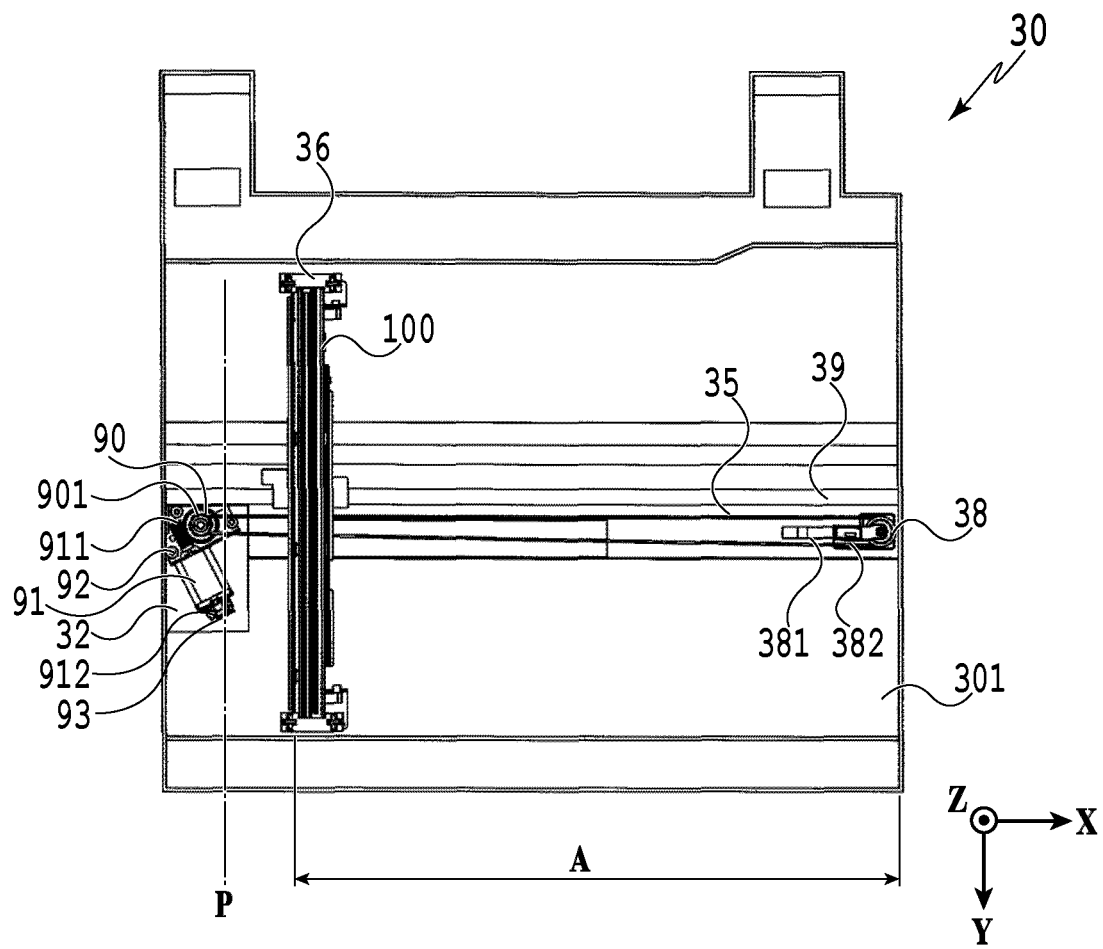
FIG. 6 is a top view for explaining a scanning mechanism for a sensor unit.

FIG. 6 is a top view for explaining a scanning mechanism for the sensor unit 36. In the sensor unit 36, a plurality of image sensors 100 that read a document image are arrayed in the Y direction. Both end portions of the sensor unit 36 in the Y direction are in contact with and supported on an inner wall of a case 301 of the scanner unit 30. Also, inside the case 301, a guide rail 39 is provided which extends in the X direction and guides and supports a center portion of the sensor unit 36.

A driving pulley 90 and a driven pulley 38 that use the scan motor 91 as a driving source are arranged at both ends of the case 301 in the ±X direction. A belt 35 is wound around the pulleys 90 and 38, and the sensor unit 36 is attached to part of the belt 35. With the above configuration, the sensor unit 36 can be moved in the +X direction or the −X direction by rotating the scan motor 91 in a forward direction or a reverse direction. At this time, the center portion of the sensor unit 36 in the Y direction is guided along the guide rail 39 and its both ends are guided along the inner wall of the case 301.

The scan motor 91 is fixed in a horizontal posture to a motor holder 92. Specifically, the scan motor 91 is fixed to the motor holder 92 such that shafts of the scan motor 91 extend in parallel to the platen glass 341 and the ADF glass 342. A motor gear 911 in the form of a worm gear or a bevel gear is attached to the shaft on the motor holder 92 side, and the motor gear 911 is in mesh with a driving pulley gear 901 formed integrally with the driving pulley 90. That is, driving force from the scan motor 91 is transmitted to the driving pulley 90 via the motor gear 911 and the driving pulley gear 901. A code wheel 912 is attached to the shaft on the other side of the body of the scan motor 91, and an encoder 93 is arranged at a position facing the code wheel 912. A signal output from the encoder 93 in response to detecting slits in the code wheel 912 is sent to the control board 11 through a cable not illustrated. The scan motor 91, the motor holder 92, the motor gear 911, the code wheel 912, and the encoder 93 described above are accommodated in the accommodating region in the accommodating portion 32.

The driven pulley 38 is held by a pulley holder 382. The pulley holder 382, which is installed movably in the X direction, is biased in the +X direction by a spring 381. In this way, the belt wound around the driving pulley 90 and the driven pulley 38 receives an appropriate tension and is therefore stretched with no slack. With the above configuration, a control unit 200 (see FIG. 9) arranged in the control board 11 can control the movement of the sensor unit 36 in the X direction by driving the scan motor 91 based on the detection signal received from the encoder 93.

A region A in FIG. 6 represents the region in which the sensor unit 36 moves in the case of reading a document in a flatbed fashion. Also, a position P represents the position at the sensor unit 36 stops in the case of reading a document in an ADF fashion.

Figure 7:
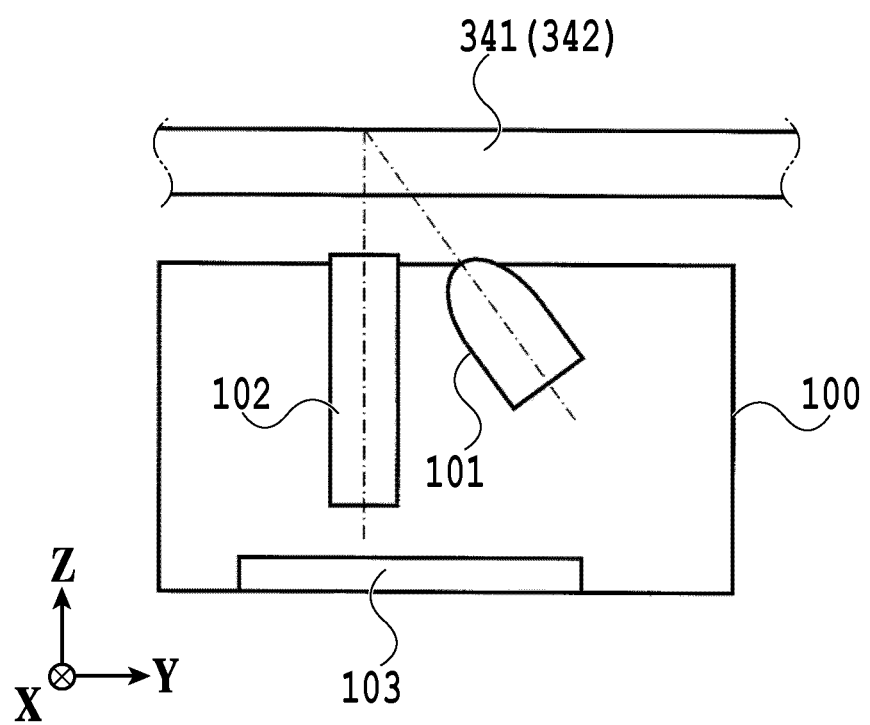
FIG. 7 is a view illustrating a configuration of an image sensor.

FIG. 7 is a view illustrating a configuration of an image sensor 100 arranged in the sensor unit 36. The image sensor 100 includes a LED 101 as a light emitting unit, a rod lens array 102, and an image sensor 103 as an imaging element. The LED 101 flashes light beams of three colors of red, green, and blue in turn at predetermined intervals. The rod lens array 102 transmits the light emitted from the LED 101 and reflected by the surface of a document placed on the platen glass 341 or the ADF glass 342 and focuses the light on the image sensor 103. As the image sensor 103, a CCD sensor, a CMOS, or the like can be employed, and it detects the intensity of the light passing through the rod lens array 102. The image sensor 103 can read a color image of the document by detecting the red, green, and blue light beams emitted from the LED 101 and reflected by the document. The detection value of the image sensor 100 is transferred to the control board 11 (see FIGS. 3A and 3B) through a flat cable not illustrated.

Figure 8A:
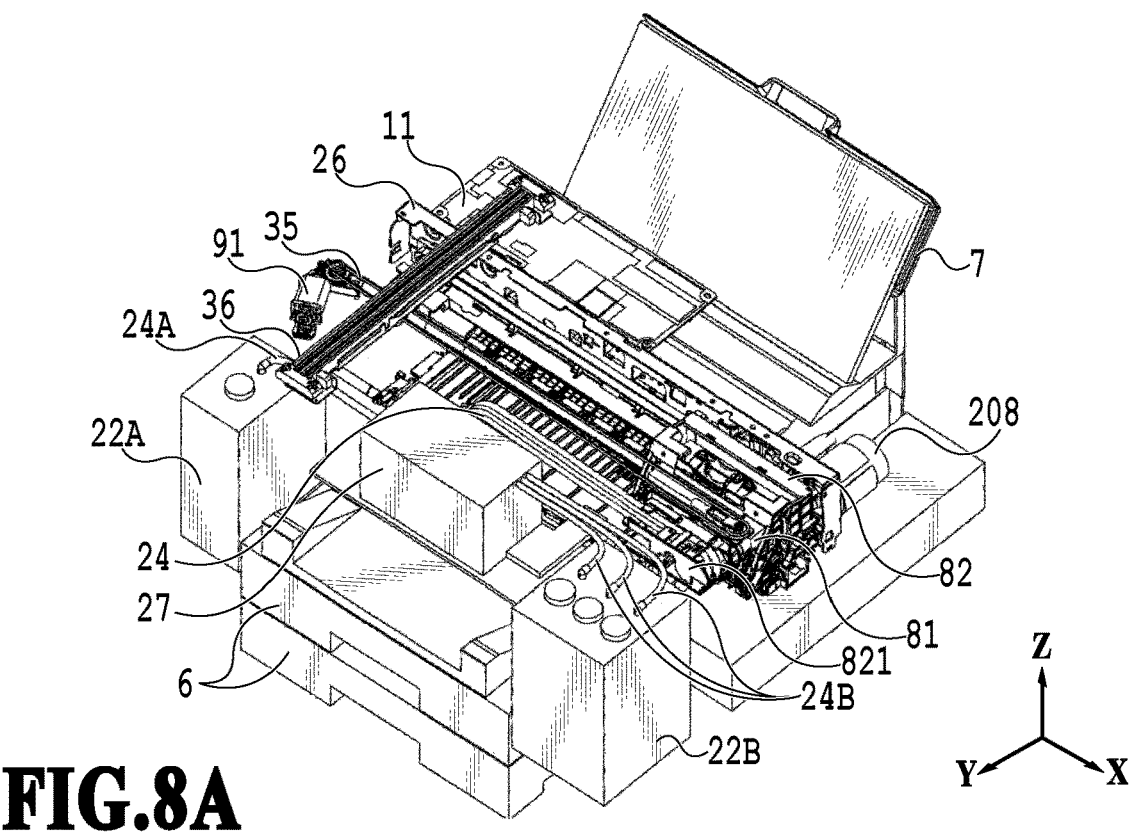
FIGS. 8A and 8B are views for explaining a positional relationship among various mechanisms in the image reading and printing apparatus.
Figure 8B:
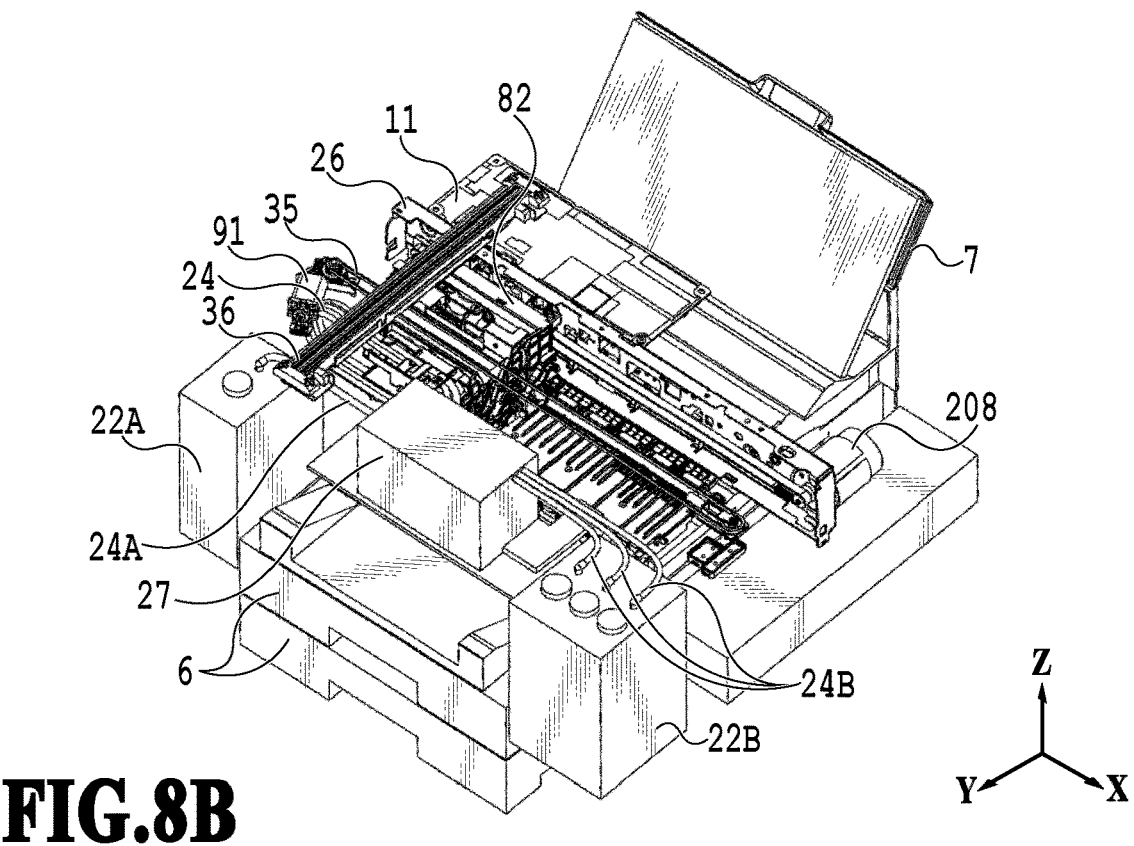

FIGS. 8A and 8B are views for explaining a positional relationship among the sensor unit 36, the scan motor 91, the carriage 82, the ink tubes 24, which move and follow the carriage 82, and the ink tanks 22 in the image reading and printing apparatus 1. FIG. 8A illustrates a state where the carriage 82 is present on the home position side (+X side), and FIG. 8B illustrates a state where the carriage 82 is present on the scan motor side (−X side). In the illustration of FIGS. 8A and 8B, the case present between the scanner unit 30 and the printing device part 2 is omitted for the sake of explanation.

The inks contained in the ink tanks 22 are supplied to the print head 81 mounted on the carriage 82 through the ink tubes 24. An ink tube 24A connects the ink tank 22A containing the black ink and a coupling portion 821 attached to the carriage 82 to each other via a valve unit 27 at the center. Three ink tubes 24B connect the ink tank 22B containing the three color inks and the coupling portion 821 to each other via the valve unit 27. In the section from the valve unit 27 to the coupling portion 821, the four ink tubes 24 are bundled together and move in the ±X direction in the region between the carriage 82 and the ink tanks 22 in the Y direction with the reciprocal movement of the carriage 82.

In the case where the carriage 82 is present on the −X side opposite to the home position as illustrated in FIG. 8B, the carriage 82 is located near the scan motor 91. For this reason, in the present embodiment, the accommodating portion 32, which accommodates the scan motor 91, is arranged so as not to interfere with the carriage 82 or the ink tank 22A located at an upper portion of the printing device part 2. Also, the ink tubes 24 are flexible. This makes it possible to lower the lower surface of the accommodating portion 32.

Figure 9:
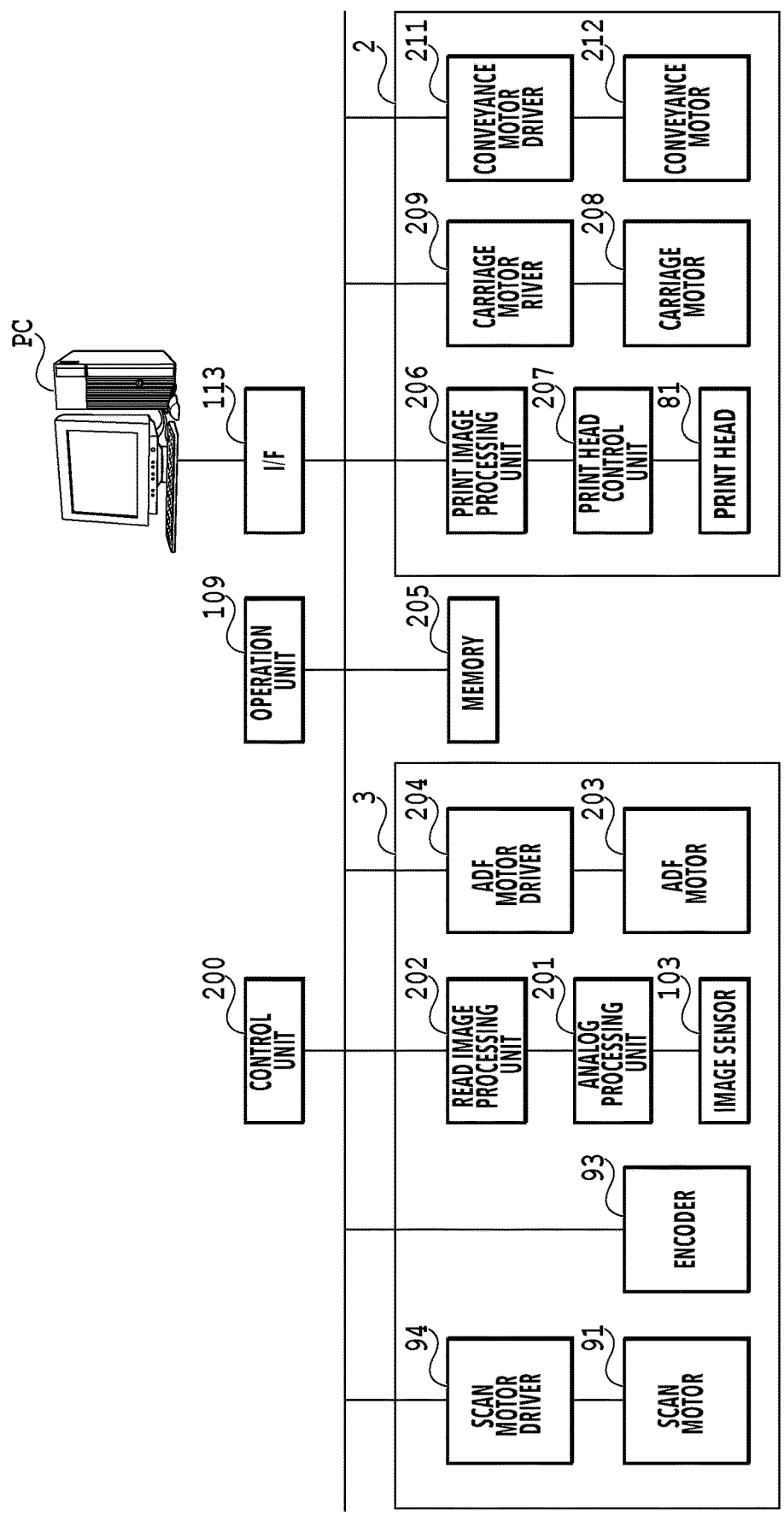
FIG. 9 is a block diagram for explaining a control configuration in the image reading and printing apparatus.

FIG. 9 is a block diagram for explaining a control configuration in the image reading and printing apparatus 1 in the present embodiment. The control unit 200 is arranged in the control board 11, has a ROM holding programs and parameters and a RAM usable as a work memory, and controls the entire apparatus.

A scan motor driver 94 drives the scan motor 91 to move the sensor unit 36. The encoder 93 sends a signal of detection of the code wheel 912 to the control unit 200. An ADF motor driver 204 drives an ADF motor 203 to convey a document loaded in the ADF 31.

An analog processing unit 201 amplifies and performs a sampling process on an analog signal detected by each image sensor 103 to convert it into a digital signal. A read image processing unit 202 performs image processing such as edge enhancement and color conversion on the digital image signal generated by the analog processing unit 201. The image sensor 103, the analog processing unit 201, and the read image processing unit 202 implement a scanner function of reading a document.

A print image processing unit 206 performs image processing such as scaling and quantization on image data received from a PC or the like to generate print data that can be printed by the print head 81. A print head control unit 207 drives the print head 81 according to the print data generated by the print image processing unit 206.

A carriage motor driver 209 drives the carriage motor 208 to move the carriage 82. A conveyance motor driver 211 drives a conveyance motor 212 to convey a sheet loaded in one of the sheet feeding cassettes 6 or the ASF 7.

A memory 205 temporarily stores image data generated by the read image processing unit 202 and image data before being subjected to the image processing by the print image processing unit 206. The operation unit 109 functions as a user interface with which the user checks the state of the image reading and printing apparatus 1 and inputs instructions addressed to the image reading and printing apparatus 1. A PC interface (I/F) 113 sends and receives information to and from a host apparatus, such as a PC, connected to the outside. Specifically, the PC interface (I/F) 113 is used by the control unit 200 in a case of receiving image data to be printed by the printing device part 2 from the host apparatus and sending image data read by the reading device part 3 to the host apparatus.

The accommodating portion 32 and members located around the accommodating portion 32 in the printing device part 2 and their layout in the image reading and printing apparatus 1 in the present embodiment will be specifically described below with reference to the above-mentioned drawings again.

The scanner unit 30 in the present embodiment needs a space to accommodate the sensor unit 36, various mechanisms for scanning the sensor unit 36, and a flat cable not illustrated to be connected to the sensor unit 36, as well as the scan motor 91. In this case, the thickness in the Z direction required to accommodate the members excluding the scan motor 91 is sufficiently smaller than the thickness required with the scan motor 91 included. That is, in a case where the thickness of the entire scanner unit 30 is determined based on the thickness required with the scan motor 91 included, the image reading and printing apparatus 1 as a whole will be larger than necessary. With the above circumstance taken into consideration, the present inventors have judged that it is effective to determine the thickness of the entire scanner unit 30 based on a dimension required for the members excluding the scan motor 91 and then arrange the portion to be occupied by the scan motor 91 such that the portion enters an empty space in the printing device part 2. For this reason, in the image reading and printing apparatus 1 in the present embodiment, at the boundary plane between the reading device part 3 and the printing device part 2, which are formed in a substantially cuboidal shape, only the accommodating portion 32 of the reading device part 3 bulges into the region of the printing device part 2.

Here, a scan motor 91 usable in the present embodiment will be described first. In the present embodiment, an oval-shape type with a diameter of 20 mm that is distributed relatively widely in the market and capable of achieving a required speed is used as the scan motor 91. In this case, attaching the encoder 93 to the scan motor 91 requires a space of about 30 mm to 40 mm in the accommodating portion in the height direction.

For this reason, as illustrated in FIG. 2B, the accommodating portion 32 has the shape of a protrusion protruding by about 30 mm to 40 mm from the bottom surface of the reading device part 3. Also, at the upper surface of the printing device part 2, the receiving portion 25, which is capable of receiving the above accommodating portion 32, is formed so as to dent by Zm, which is equal to about 30 mm to 40 mm, from the upper surface. In the state where the reading device part 3 is closed, the accommodating portion 32 and the receiving portion 25 fit together such that the bottom surface of the reading device part 3 and the upper surface of the printing device part 2 contact each other and maintain a substantially horizontal posture, as illustrated in FIG. 3B.

At this time, a front surface 252 (+Y-side surface) of the receiving portion 25 faces one of the ink tanks 22 in the Y direction. The ink tank 22 has an upper side surface 221, a lower side surface 222, and an inclined side surface 223 connecting these. The upper side surface 221 and the lower side surface 222 extend substantially in parallel in the Z direction, and the lower side surface 222 is located on the far side of the upper side surface 221 and the front surface 252 of the receiving portion 25 in the depth direction (−Y direction). In FIG. 2B, an overlap region between the ink tank 22 and the receiving portion 25 in the Y direction is denoted by Yf. Specifically, at an upper region where the receiving portion 25 is present, the ink tank 22 has a small depth so as not to interfere with the receiving portion 25 while at a lower region where the receiving portion 25 is not present, the ink tank 22 has a large depth so as to form the overlap region Yf with the receiving portion 25. In this way, it is possible to avoid interference between the ink tank 22 and the receiving portion 25 while also increasing the containable amount of the ink in the ink tank 22 within the limited space.

On the other hand, a rear surface 253 (−Y-side surface) of the receiving portion 25 faces the front side of the carriage 82 at the same height in the vertical direction. The carriage 82 has a shape that is high on the rear side (−Y side) and low on the front side, on which the coupling portion 821 and the ink tubes 24 are arranged. With this configuration, the receiving portion 25 in the present embodiment is provided so as to protrude into the empty space on the front side. In FIG. 2B, an overlap region between the carriage 82 and the receiving portion 25 in the Y direction is denoted by Yr. In this case, even if the size of the carriage 82 and the carriage motor 208 is increased for the purpose of, for example, improving the throughput, as long as a low region where the coupling portion 821 and the ink tubes 24 are arranged is formed at the front of the carriage 82, the receiving portion 25 can be arranged in that region.

As illustrated in FIGS. 4A and 4B, under (−Z direction) the accommodating portion 32 and the receiving portion 25 is a space for movement of the carriage 82 and the ink tubes 24 for supplying the inks to the print head 81. The ink tubes 24 in the present embodiment are made of a soft and flexible material, such as silicone or thermoplastic (TPE). They extend in the X direction while making a U-turn so as to draw an arc on the left side in FIGS. 4A and 4B, and move reciprocally in the X direction within the above-mentioned space with movement of the carriage 82. Thus, as illustrated in FIG. 4A, while the carriage 82 is present on the home position side (+X side), a space is formed under the accommodating portion 32. On the other hand, as the carriage 82 approaches the accommodating portion 32, the arcs of the ink tubes 24 get under the accommodating portion 32 and the bottom surface of the receiving portion 25 restricts the ink tubes 24 from expanding upward.

In the present embodiment, a restriction member 251 that restricts sticking of the ink tubes 24 is arranged on the bottom surface of the receiving portion 25. The configuration of the restriction member 251 is not particularly limited but it may be, for example, a member with a plurality of small semispherical protrusions arranged thereon. In this way, the ink tubes 24 come into contact with the restriction member 251 at a plurality of points. Accordingly, the resistance applied during contact can be reduced as compared to a case where the ink tubes 24 come into surface contact. That is, providing the restriction member 251 makes it possible to smoothly scan the carriage 82 while also keeping the movement region for the flexible tubes compact. Note that in the present embodiment, the inner diameter of each ink tube 24 is 4.0 mm to 5.0 mm and the diameter of the arc formed on its left side is about 50.0 mm.

As described above, in the present embodiment, the scan motor 91, which is a constituent element of the reading device part 3, is arranged in the gap space formed between the ink tank 22 and the carriage 82, which are constituent elements of the printing device part 2. Moreover, the restriction member 251, which suppresses sticking of the ink tubes 24, is arranged on the bottom surface of the receiving portion 25, and a movement region for the ink tubes 24 is formed immediately under the restriction member 251. In this way, it is possible to tightly arrange the constituent elements of the printing device part 2 and the constituent element of the reading device part 3 and thus to promote downsizing of the entire apparatus to a greater extent than conventional ways while enabling smooth scan of the carriage without causing an increase in component cost and the like.

Second Embodiment

An image reading and printing apparatus 1 in the present embodiment also has a configuration basically similar to that in the first embodiment. In the present embodiment, however, a scan motor 95 propels itself in the ±X direction along with the sensor unit 36. A configuration different from the first embodiment will be described below. Note that the members denoted by the same signs as those in the first embodiment have the same functions as those in the first embodiment.

Figure 10:
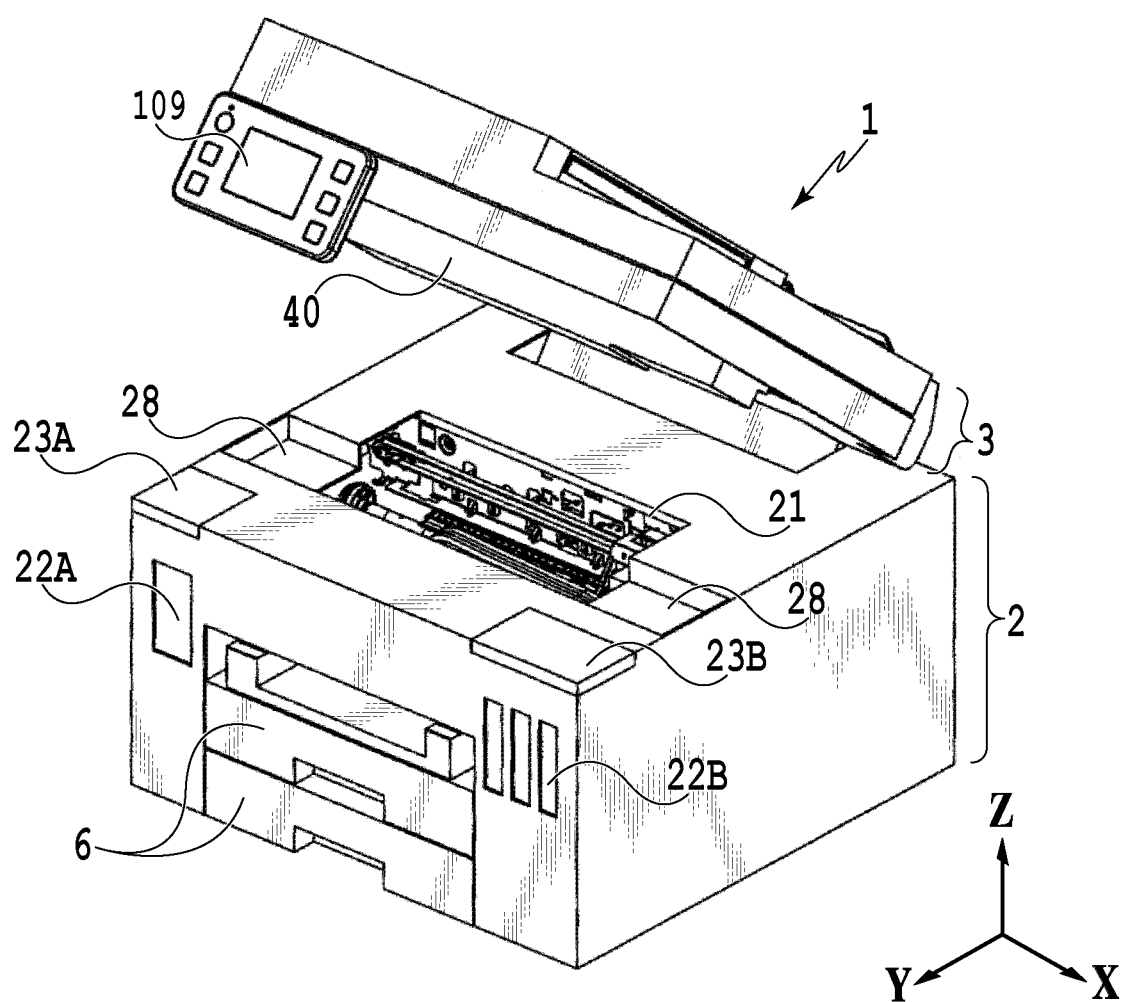
FIG. 10 is a perspective view of an exterior of an image reading and printing apparatus used in a second embodiment.

FIG. 10 is a perspective view of an exterior of the image reading and printing apparatus 1 used in the present embodiment. FIG. 10 illustrates a state where the reading device part 3 is opened relative to the printing device part 2. Since the scan motor 95 (see FIG. 11) propels itself along with the sensor unit 36, the configuration is such that the region to accommodate the scan motor 95, i.e., the region protruding downward from the bottom surface of the reading device part 3, extends in the X direction. In the present embodiment, this accommodating region will be referred to as the self-propulsion region accommodating portion 40.

On the other hand, at the upper surface of the printing device part 2, self-propulsion region receiving portions 28 are formed which dent from the upper surface and accommodate the self-propulsion region accommodating portion 40. Since the upper surface of the printing device part 2 is provided with the opening 21 for the user to perform maintenance, one self-propulsion region receiving portion 28 is arranged on each of the left and right sides of the opening 21.

Figure 11:
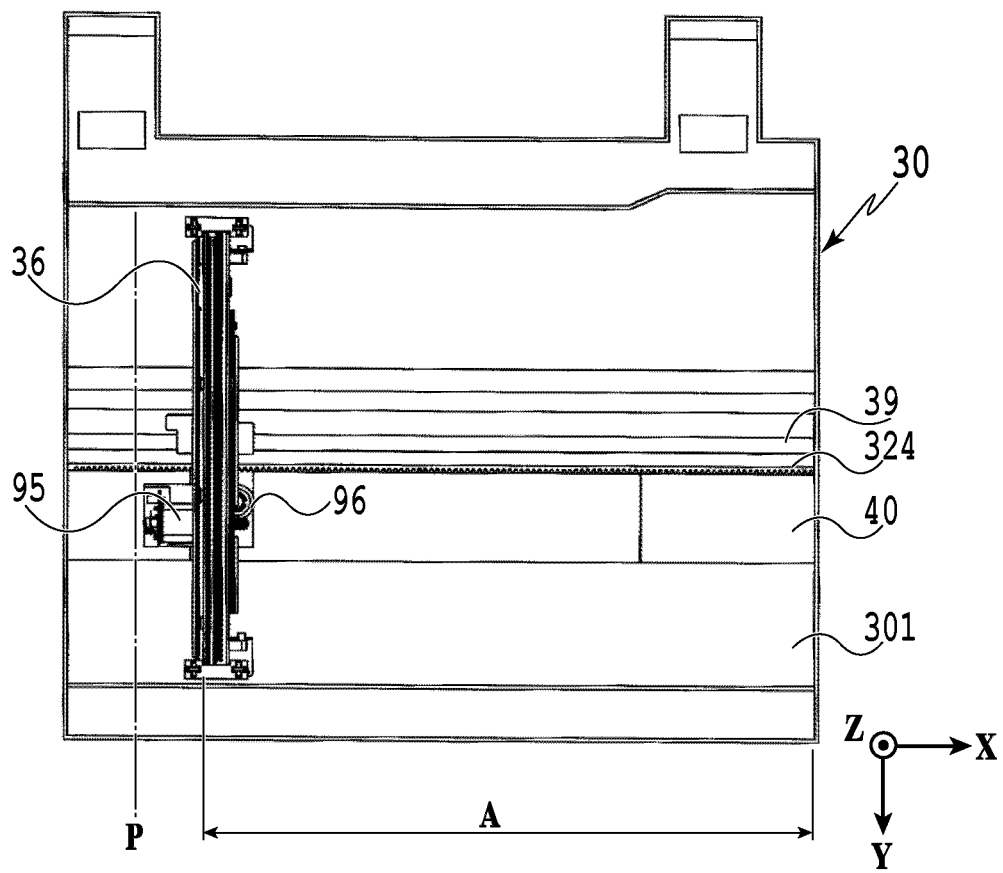
FIG. 11 is a top view for explaining a scanning mechanism for a sensor unit in the second embodiment.

FIG. 11 is a top view for explaining a scanning mechanism for the sensor unit 36 in the present embodiment. To the scan motor 95 in the present embodiment, a driving unit 96 having a gear is attached. Inside the case 301, a rack 324 which engages with the gear of the driving unit 96 extends in the X direction, in addition to the guide rail 39, which guides and supports the sensor unit 36. Thus, as the scan motor 95 rotates in a forward direction or a reverse direction, the sensor unit 36 and the scan motor 95 move in the +X direction or the −X direction.

Figure 12:
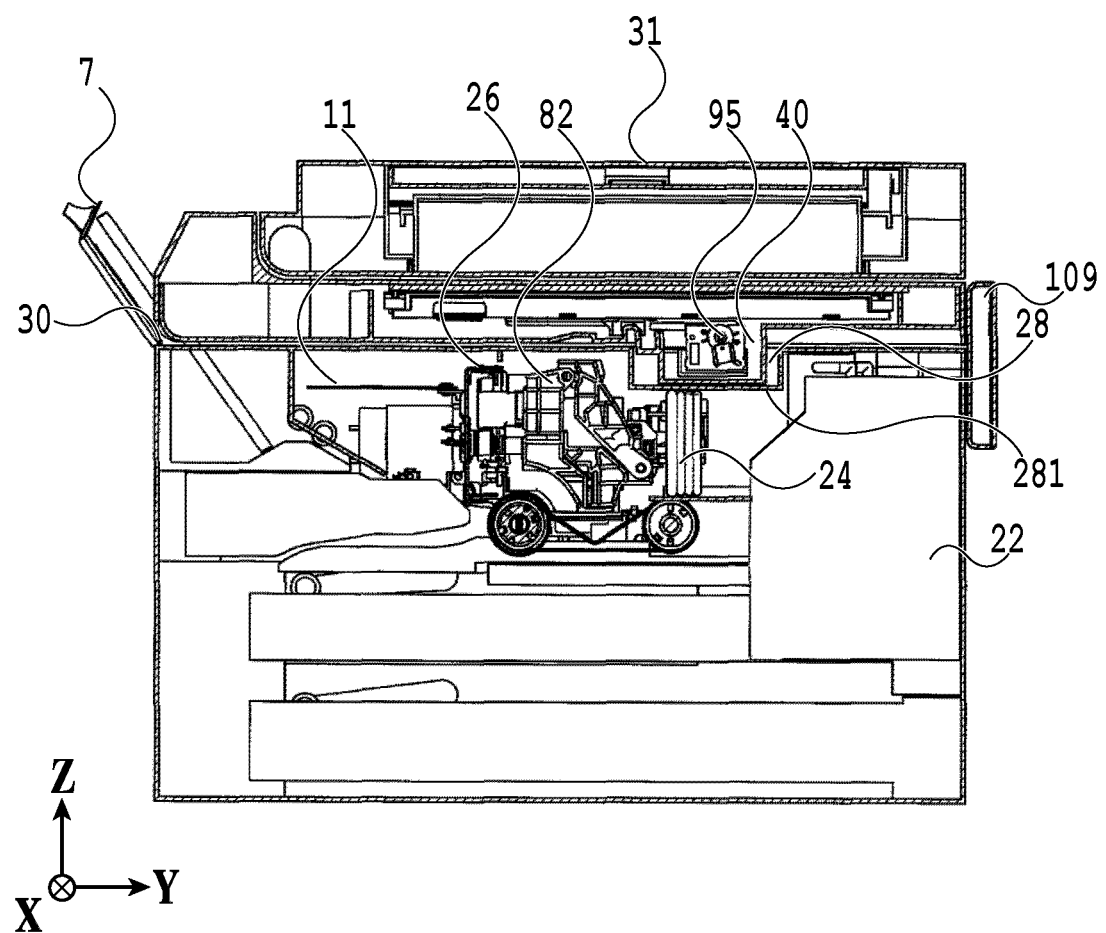
FIG. 12 is a side cross-sectional view of the image reading and printing apparatus used in the second embodiment.

FIG. 12 is a side cross-sectional view of the image reading and printing apparatus 1 used in the present embodiment. In the state where the reading device part 3 is closed, the bottom surface of one of the self-propulsion region receiving portions 28 restricts the ink tubes 24 from expanding upward. In the present embodiment too, a restriction member 281 that restricts sticking of the ink tubes 24 is arranged on the bottom surface of the self-propulsion region receiving portion 28.

Figure 13A:
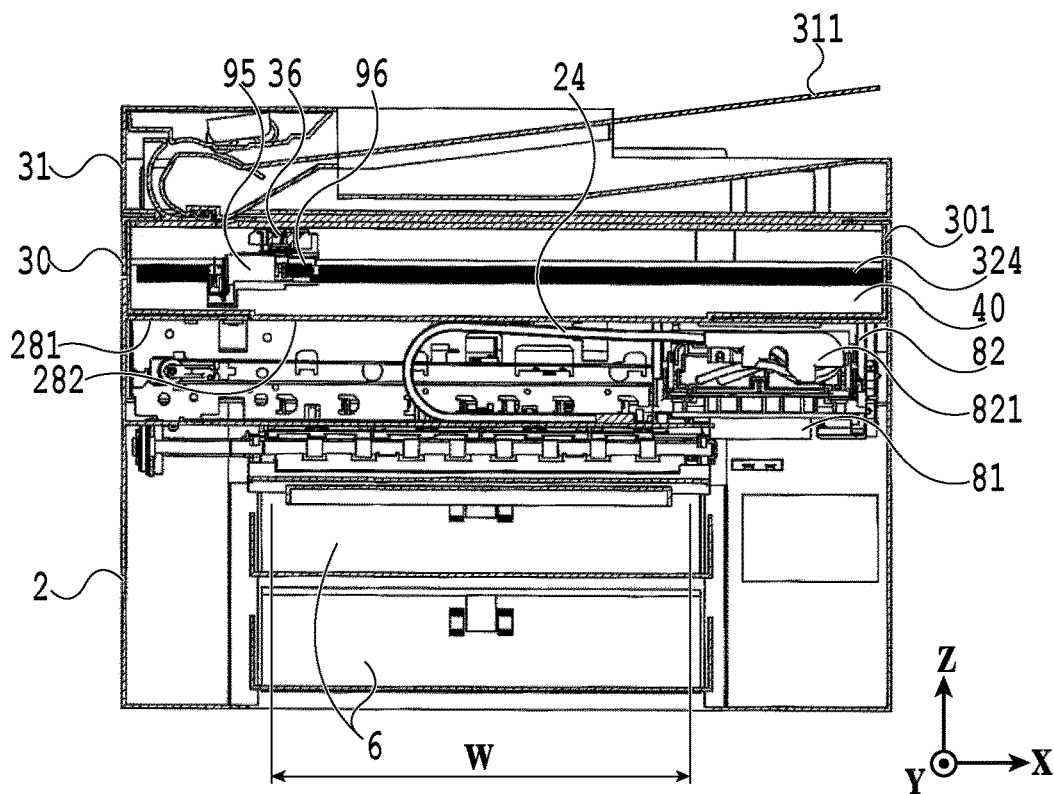
FIGS. 13A and 13B are front cross-sectional views of the image reading and printing apparatus used in the second embodiment.
Figure 13B:
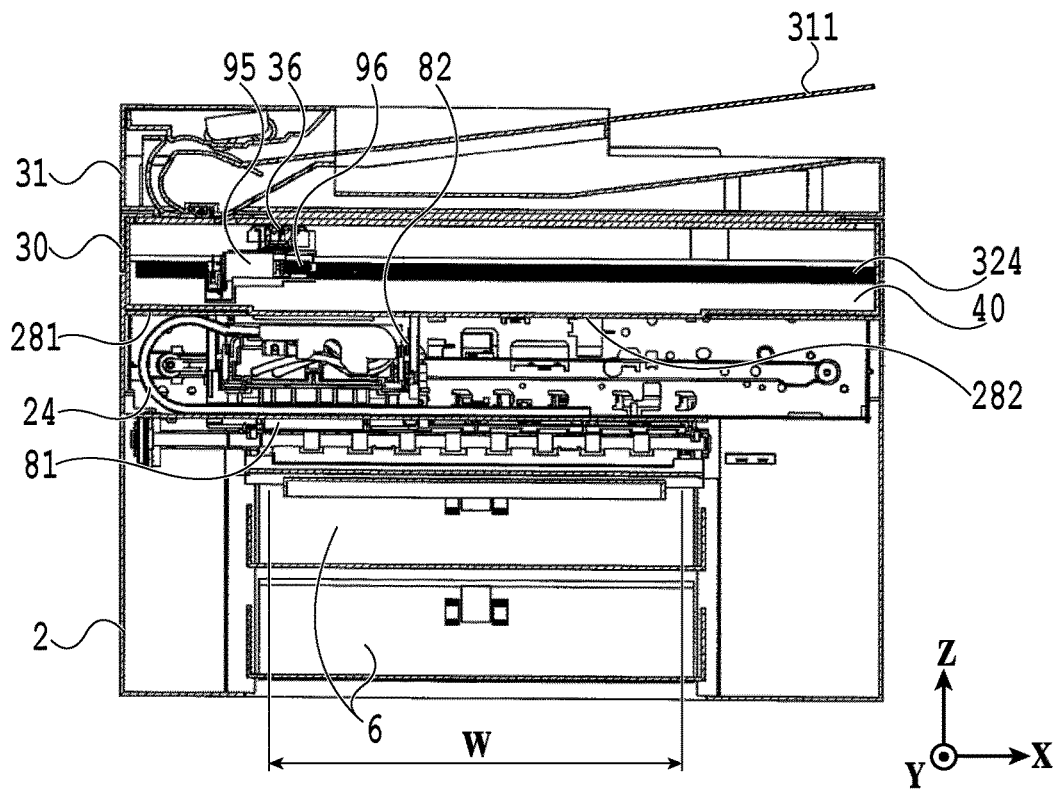

FIGS. 13A and 13B are front cross-sectional views of the image reading and printing apparatus 1. FIG. 13A illustrates a state where the carriage 82 is present at the right end of the scannable region, and FIG. 13B illustrates a state where the carriage 82 is present at the left end. In the state where the reading device part 3 is closed, the lower surface of the self-propulsion region accommodating portion 40 is located above the opening 21 of the printing device part 2, and the ink tubes 24 moving with the carriage 82 are in contact with this lower surface of the self-propulsion region accommodating portion 40. For this reason, in the present embodiment, a restriction member 282 similar to that on the bottom surface of the self-propulsion region receiving portion 28 is arranged on the lower surface of the self-propulsion region accommodating portion 40 as well. That is, according to the present embodiment, the restriction members 281 and 282 are arranged along the entire region where the ink tubes 24 move. This makes it possible to smoothly scan the carriage 82 while also keeping the movement region for the ink tubes 24 compact.

As described above, in the present embodiment, the self-propelling scan motor 95, which is a constituent element of the reading device part 3, and its self-propulsion region are accommodated in the gap space formed between each ink tank 22 and the carriage 82, which are constituent elements of the printing device part 2. Moreover, the restriction members 281 and 282, which restrict sticking of the ink tubes 24, are arranged on the surfaces that form the movement region for the ink tubes 24, and the movement region for the ink tubes 24 is formed immediately under these restriction members 281 and 282. In this way, it is possible to tightly arrange the constituent elements of the printing device part 2 and the constituent element of the reading device part 3 and thus to promote downsizing of the entire apparatus to a greater extent than conventional ways without causing an increase in component cost and the like.

Other Embodiments

In the above, the reading device having the ADF 31 and the scanner unit 30 (reading device part 3) has been exemplarily described. However, including the ADF 31 in the reading device is not an essential requirement. The reading device only needs to have the function of a flatbed scanner in which the sensor unit 36 moves by means of the scan motor 91 or 95.

Also, in the above, the ink tubes 24 have been described as soft bodies that follow movement of the carriage 82.

However, the soft bodies are not limited to the ink tubes 24 and may be any flexible members that are coupled to the carriage and move along with the carriage inside the apparatus. For example, the soft bodies may be flexible cables electrically connecting the carriage 82 and the control board 11, or both the ink tubes 24 and the flexible cables.

Also, in the above embodiments, an inkjet print head is used as the print head 81, but the print head may be one that prints images by another method. Also, the printing agents do not have to be inks, and the ink tanks only need to contain appropriate printing agents.

In any case, the above embodiments function effectively as long as the configuration is such that a flatbed-type reading device part is provided on a printing device part including a carriage that carries a print head and moves within the device and a flexible member that moves and follow the carriage inside the device.

According to the present invention, it is possible to reduce the height of an entire image reading and printing apparatus having both a reading function and a printing function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-218726 filed Dec. 28, 2020, which is hereby incorporated by reference wherein in its entirety.

What is claimed is:

1. A printing apparatus having a housing including a printing device and a reading device placed on an upper side of the printing device in a vertical direction,
the printing device comprising:
a carriage mounted with a printing unit capable of printing an image and configured to move reciprocally over a print medium conveyed in a first direction in a second direction crossing the first direction;
a flexible member configured to move and follow the carriage; and
a tank for containing a printing agent to be used by the printing unit, the reading device comprising:
a sensor unit configured to read an image of an original copy; and
a driving unit configured to move the sensor unit relative to the original copy,
wherein the driving unit occupies an accommodating region protruding from a bottom surface of the reading device toward the printing device,
part of the flexible member overlaps with the accommodating region in the first direction on a lower side of the accommodating region in the vertical direction, and
part of the tank is located within the housing and overlaps with the accommodating region in the second direction on a lower side of the accommodating region in the vertical direction.

2. The printing apparatus according to claim 1, wherein a restriction member that restricts sticking of the flexible member is arranged on the lower side of the accommodating region in the vertical direction.

3. The printing apparatus according to claim 1, wherein
in a state where the carriage is present on the tank side in the second direction, the accommodating region overlaps with part of the carriage in the second direction, and wherein
the accommodating region occupies a part of an upper portion of a region in which the carriage moves and a part of a region adjacent to an upper portion of the tank in the first direction.

4. The printing apparatus according to claim 3, wherein a lower surface of the tank is present on a lower side in the vertical direction relative to a lower surface of the printing unit.

5. The printing apparatus according to claim 3, wherein an upper side surface of the tank faces the accommodating region in the first direction, and a lower side surface of the tank overlaps with the accommodating region in the first direction.

6. The printing apparatus according to claim 1, including an accommodating portion forming the accommodating region,
wherein a coupling portion that couples the flexible member to the carriage is arranged on a lower side in the vertical direction relative to the accommodating portion, and
the flexible member extends along such a route as to extend in the second direction from the coupling portion toward the accommodating portion and make a U-turn in the vertical direction.

7. The printing apparatus according to claim 1, wherein the flexible member is a tube through which to supply a printing agent to the printing unit.

8. The printing apparatus according to claim 1, wherein the reading device further comprises
a driving pulley coupled to the driving unit,
a driven pulley arranged away from the driving pulley in a direction of movement of the sensor unit, and
a belt which is wound around the driving pulley and the driven pulley and to which the sensor unit is attached, and
the accommodating region is arranged at a position closer to the driving pulley than to the driven pulley.

9. The printing apparatus according to claim 1, wherein the driving unit moves along with the sensor unit in the first direction, and
the accommodating region extends in the first direction so as to include a region in which the driving unit moves.

10. The printing apparatus according to claim 1, wherein a conveyance unit configured to convey the original copy to the reading device is further placed on the reading device.

11. The printing apparatus according to claim 1, wherein the printing unit is an inkjet print head that ejects an ink according to print data.

* * * * *